United States Patent [19]

Zun

[11] Patent Number: 5,191,674
[45] Date of Patent: Mar. 9, 1993

[54] DIRECTION SETTING DEVICE FOR A STROLLER

[76] Inventor: Hong-Fu Zun, No. 59, Alley 85, Lane 673, Chung-Chen Rd., Jen-Te Hsiang, Tainan Hsien, Taiwan

[21] Appl. No.: 831,843

[22] Filed: Feb. 6, 1992

[51] Int. Cl.$^5$ .......................................... B60B 33/00
[52] U.S. Cl. .................................................. 16/35 R
[58] Field of Search ...................................... 16/35 R

[56] References Cited

U.S. PATENT DOCUMENTS 4,543,685 10/1985 Kassai .................................. 16/35 R
4,570,288 2/1986 Kassai .................................. 16/35 R Primary Examiner—Robert L. Spruill
Assistant Examiner—Carmine Cuda
Attorney, Agent, or Firm—Nixon & Vanderhye

[57] ABSTRACT

The direction setting device includes a first connector having a tubular member with a casing extending at an incline from the same and in communication with the tubular member, a spring biased key member which is movably provided in the casing, and a second connector. The casing has a pair of aligned elongated slots, and the key member has a through-hole and an elongated through slot. The second connector includes a tubular top portion with a control notch rotatably and slidably inserted into the lower portion of the first connector where the key member extends into the control notch of the second connector. A plate with a control groove which has two differing troughs is pivoted to the housing in such a manner that a pin passes through the through-hole of the key member, and through the elongated slot of the housing to extend into one of the troughs. Movement of the pin in the troughs can lock the second connector or permit it to rotate with respect to the first connector.

4 Claims, 7 Drawing Sheets

DIRECTION SETTING DEVICE FOR A STROLLER

BACKGROUND OF THE INVENTION

1. Field of Invention

This invention relates to a direction setting device, more particularly to a direction setting device of a stroller which device includes fewer components than the prior art models so that it is easier to assemble and produce.

2. Description of the Related Art

Direction setting devices for strollers are well known in the art. One of these, U.S. Pat. No. 931741, is shown in FIG. 1. As illustrated, the device includes an upper connector (A) which is adapted to be connected to a leg supporting the seat of a baby stroller and which has a shaft (A3) and a spring (B2) biased key member (B) mounted thereon, and a lower connector (C) which is adapted to be connected to a rear roller holder (F) of the baby stroller. The lower connector (C) includes a tubular member for rotatably receiving the shaft (A3) of the upper connector (A). The tubular member has a circular contacting surface (C2) made to abut the key member (B) and a key way (C1) on the circular contacting surface (C2) which receives the key member (B) of the upper connector (A) to prevent the rotation of the lower connector relative to the upper connector (A).

A control mechanism (D) urges the key member (B) against the bias action of the spring (B2), moving it ton a first position in which the key member (B) is spaced from the circular contacting surface of the lower connector so that the lower connector can rotate relative to the upper connector allowing the front roller of the stroller to move in any direction and a second position in which the key member is biased to extend into the key way (C1) of the lower connector (C), preventing the rotation of the lower connector relative to the upper connector, as shown in FIG. 2.

It has been found that the above-mentioned direction setting device, though useful includes too many components and its construction is a bit complicated. Therefore, the construction cost is correspondingly high.

SUMMARY OF THE INVENTION

It is therefore a primary object of the present invention to provide a direction setting device which includes fewer components when compared with the prior art and which is therefore easy to assemble.

Another object is to provide a direction setting device including a U-shaped frame with two plates, each with an inner control groove having two troughs of differing depth, actuation of which can set the direction of the roller of a baby stroller.

According to the present invention, the direction setting device includes a first connector having a tubular member and a housing extending at an incline from the tubular member and in communication with the same. A second connector includes a tubular top portion having a control notch which is rotatably and slidably inserted into the first connector. The housing defines a receiving space therein and includes two opposed, aligned first elongated slots. A spring biased key member which includes a second elongated through slot and a through-hole adjacent to the second elongated through slot is movably provided in the receiving space of the housing. A U-shaped control member which includes two plates is pivotally connected to the housing by a first pin member which passes through the second elongated slot of the key member. Each of the two plates has an inner surface with a control groove, including a first trough, a second trough deeper than the first trough and a ridge between the first and second troughs. A second pin member passes through the through-hole of the key member and the first elongated slots of the housing, with its two free ends extending into the second trough of the control groove of the control member, in which configuration the key member extends into the control notch of the second connector, preventing the rotation of the second connector relative the first connector. Actuation of the control member can move the second pin member from the second trough into the first trough, in which configuration the spring biased key member retracts from the control notch of the second connector, permitting the same to be rotated relative to the first connector.

BRIEF DESCRIPTION OF THE DRAWINGS

Other features and advantages of the present invention will become apparent in the following detailed description, including drawings, all of which includes a non-limiting form of the present invention, and of which.

DETAILED DESCRIPTION OF THE PREFERRED EMBODIMENT

Figure 1:
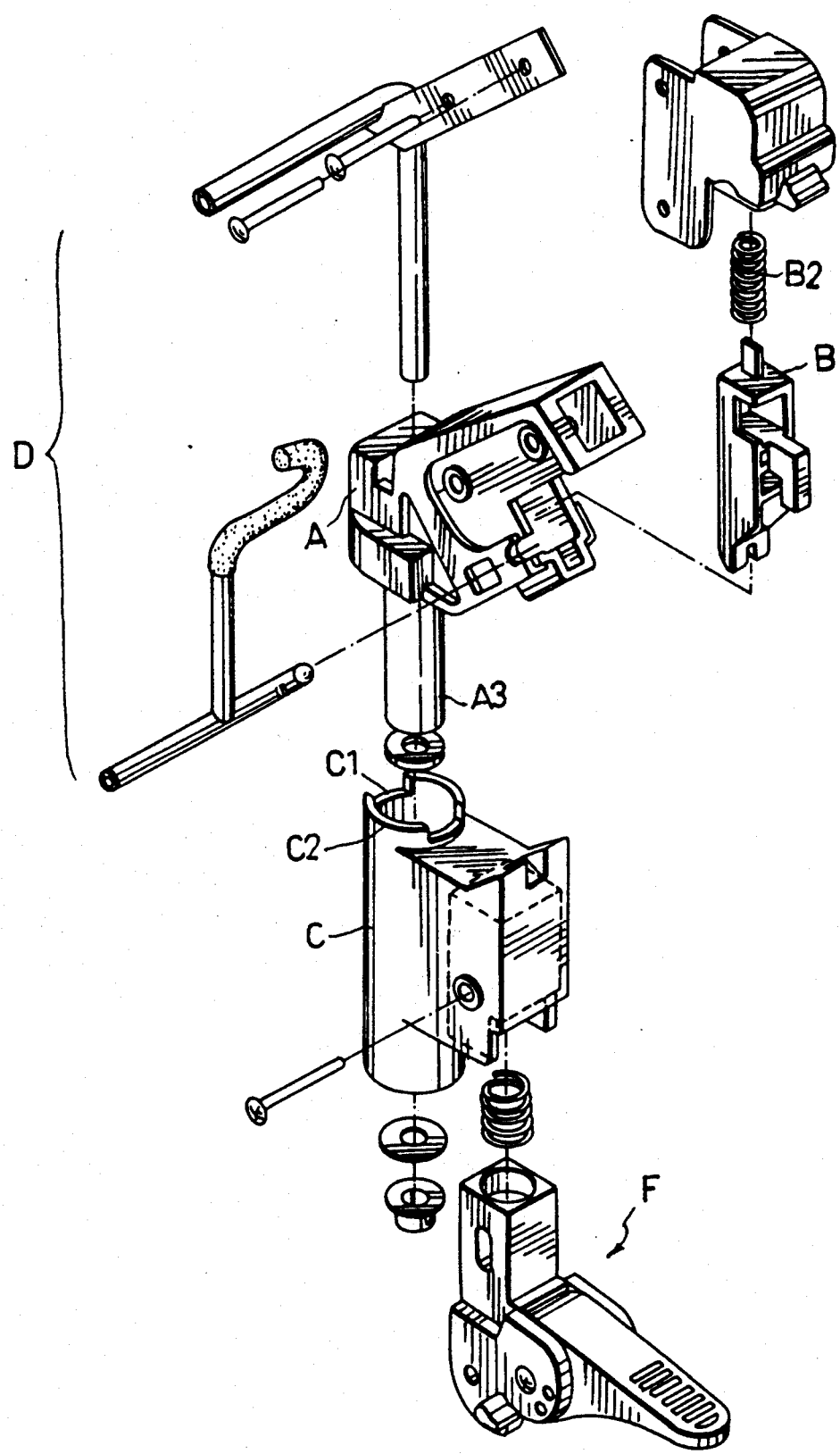
FIG. 1 is an exploded view of the direction setting device of the cited U.S. Patent which is employed in a stroller.
Figure 2:
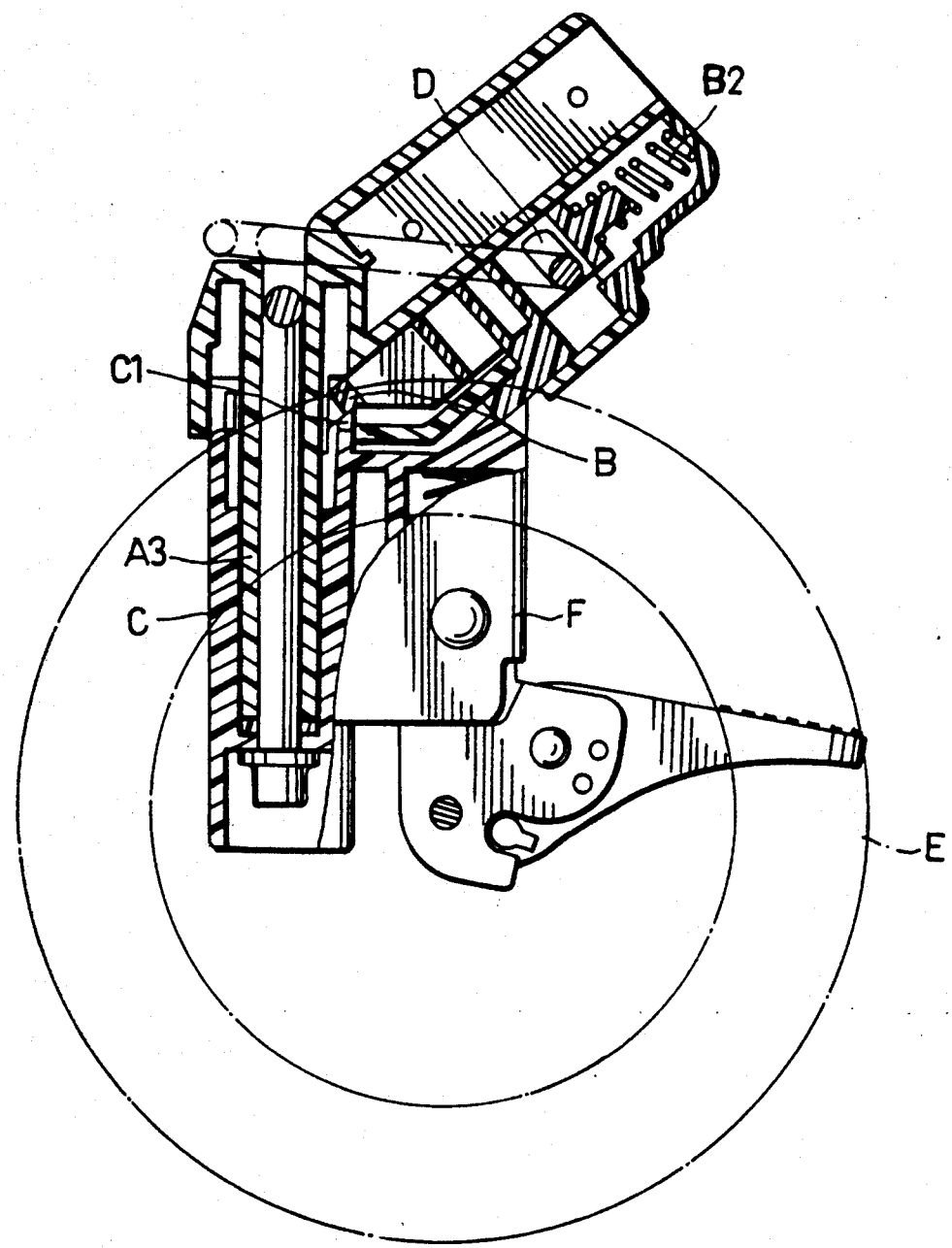
FIG. 2 is the direction setting device of FIG. 1 being employed in a roller of the stroller.
Figure 3:
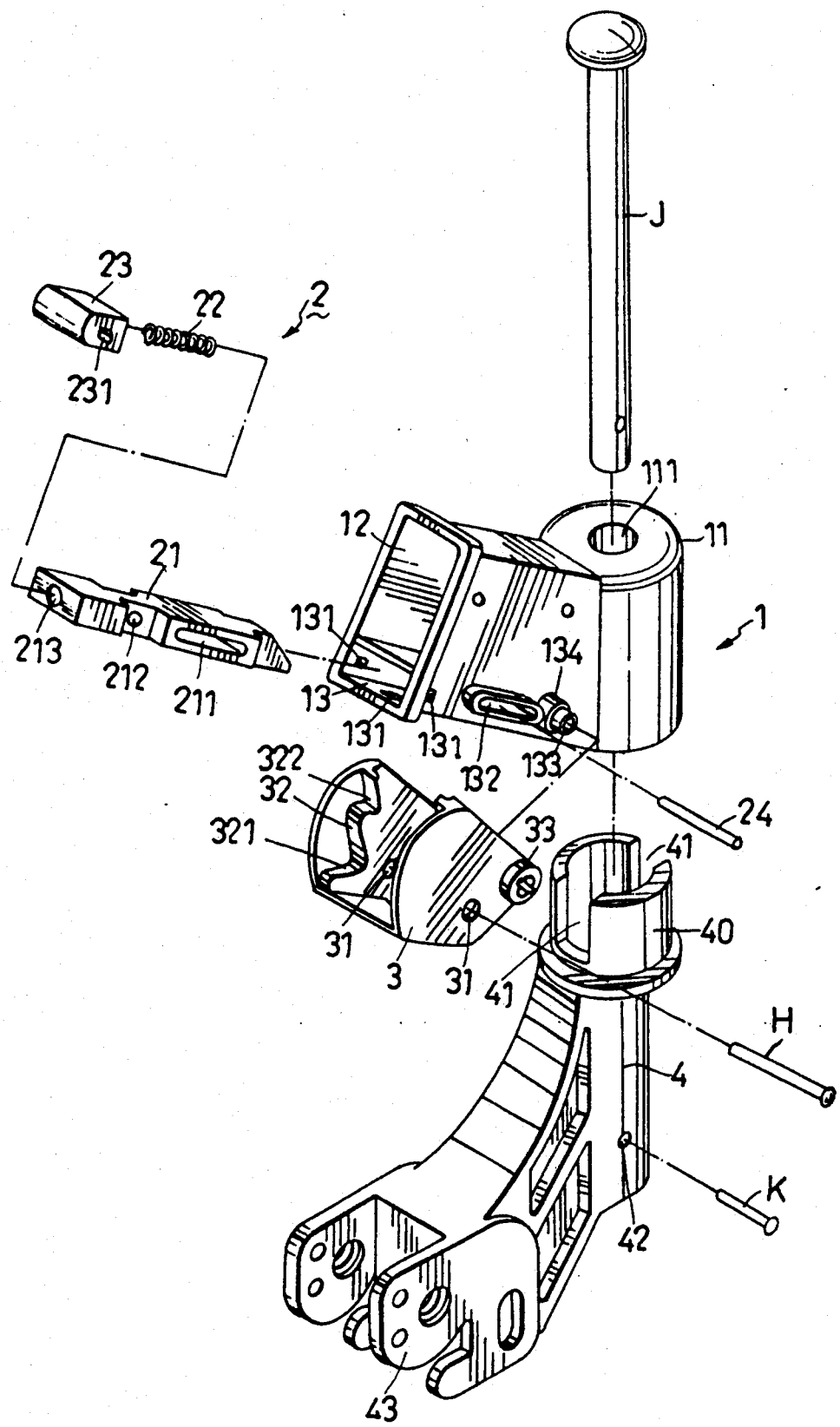
FIG. 3 shows an exploded view of a direction setting device of the present invention to be employed in a stroller.

Referring to FIG. 3, a direction setting device of the present invention is shown to include an upper connector (1), a lower connector (4), a control member (3) and a spring biased key member assembly (2).

The upper connector (1) includes a tubular member (11) defining a hollow tunnel (111) therethrough and a housing containing an upper chamber (12) to receive a support of a seat of a stroller and a lower chamber (13) which possesses an access into the interior of the hollow tunnel (111). The lower chamber (13) has two pairs of mounting holes (131, 133), one pair (133) of which is made to have an outward projection (134) flush with an outwardly extending slot projection (132) formed between the two mounting holes (131,133). The outward projection (134) is provided with a restricted end (133).

The lower connector (4) is also formed as a tubular member with a top portion including two upwardly extending curved wall bodies (40) which define a pair of control slots (41) therebetween, which top portion is rotatably and slidably inserted into the lower portion of the first connector (1). The bottom end (43) of the lower connector (4) holds a roller (not depicted) therebetween. A shaft (J) is inserted through the first and second connectors and is held together by a pin (K) in such a manner that the former and latter can rotate with respect to one another.

The key member (21) includes an elongated through slot (211), a through-hole (212) adjacent to the through slot (211) and a recession (213) at one end. The other of the key member (21) forms a tapered end. The key member (21) is movably provided in the lower chamber (13). A compression spring (22) is received in the recess (211). A fixing unit (23) is plugged upon the key member (22) in such a manner that two side projections (231) of the same extend through the mounting holes (131) of the lower chamber (13), engaging the key member in the lower chamber and biasing the tapered end of the key member (21) into the slot (41) of the lower connector (4).

A substantially U-shaped control member (3) includes two plates which are pivoted to the housing at the projection (134) where two restricted ends (133) of the projection (134) extend through a pair of aligned holes (31) of the U-shaped member (3). A first pin member (H) is slidably inserted through the restricted ends (133) of the projection, which also passes through the elongated through slot (211) of the key member (21). Each of the plates includes an inner surface with a control groove having a first trough (322), a second trough (321) deeper than said first trough and a ridge (32) between the first and second troughs.

Figure 4:
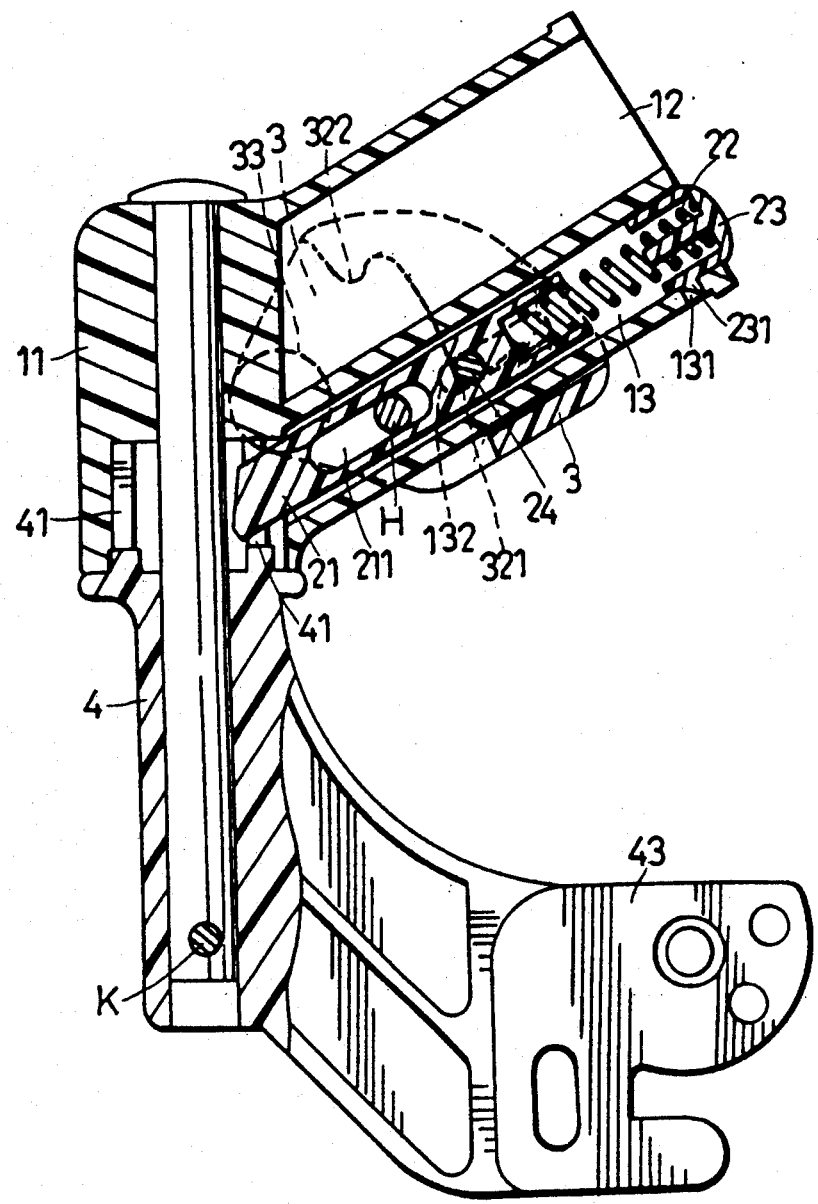
FIG. 4 shows a cross sectional view of the direction setting device of the present invention, showing that the lower connector to which a roller of the stroller is attached can not rotate relative to the upper connector.
Figure 5:
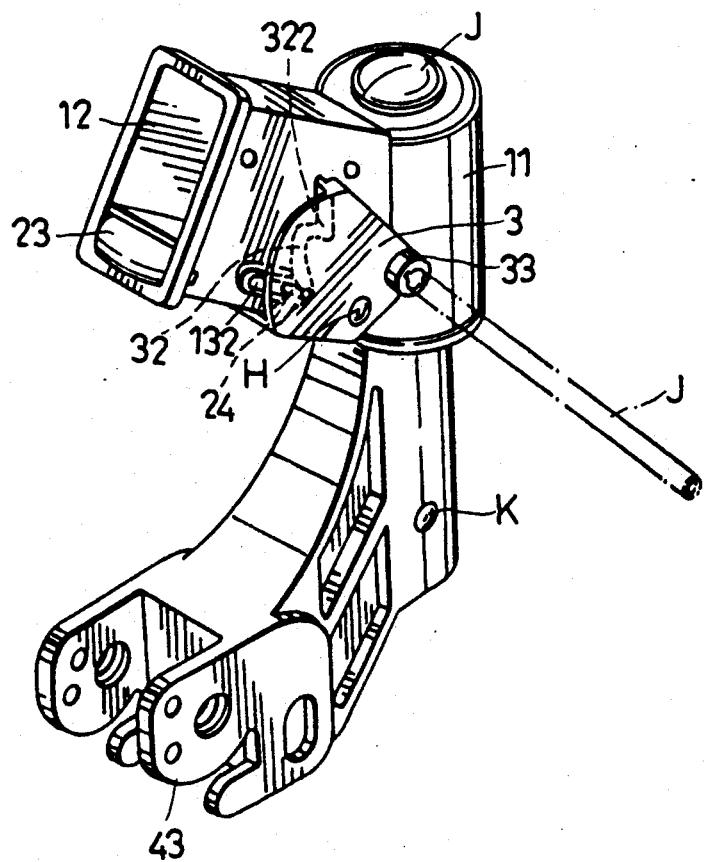
FIG. 5 shows a perspective, schematic view of the direction setting device of the present invention after assembly.
Figure 6:
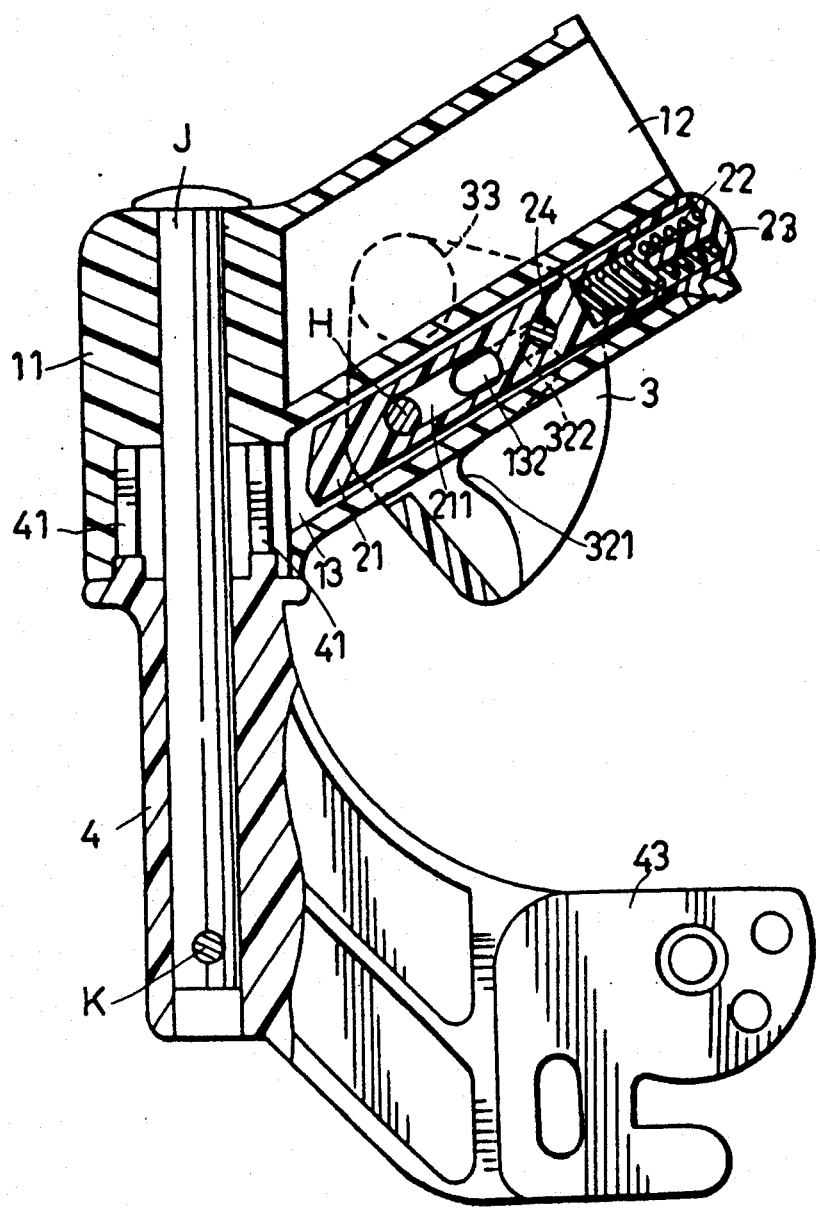
FIG. 6 shows a cross sectional view of the direction setting device of the present invention, showing that the lower connector can rotate relative to the upper connector.

A second pin member (24) passes through the through-hole (212) of the key member (21) and the slot projection (132) of the lower chamber (13), with the two free ends of the second pin member (24) extending into the second troughs of the two plates of the U-shaped frame, as shown in FIG. 5. In that configuration, the tapered end of the key member (21) will extend into the control slot (41) of the lower connector (4) due to the downwardly extending biasing force of the spring member (22) as can be seen in FIG. 4. Thus, the lower connector (4) cannot rotate relative to the upper connector, and correspondingly the direction of the roller holder cannot be set.

Since the second pin member (24) is movable in the control groove when the U-shaped frame (3) pivots about the first pin member (H), the second pin member (24) can be moved from the second trough (321) into the first trough (322) against the biasing force of the spring member (22). In that situation, the tapered end of the key member (21) retracts from the control slot (41) of the lower connector (4) so that the latter can be rotated relative to the upper connector (1) and the direction of the roller can be set. If desired, the second pin member (24) can be moved back to the second trough (321).

In place of the U-shaped frame (3), a single plate with the above-mentioned control groove can be employed in the present invention. Therefore the invention is not limited to the U-shaped frame alone but should cover any shapes and means so long as it can move the second member between the two troughs.

Figure 7:
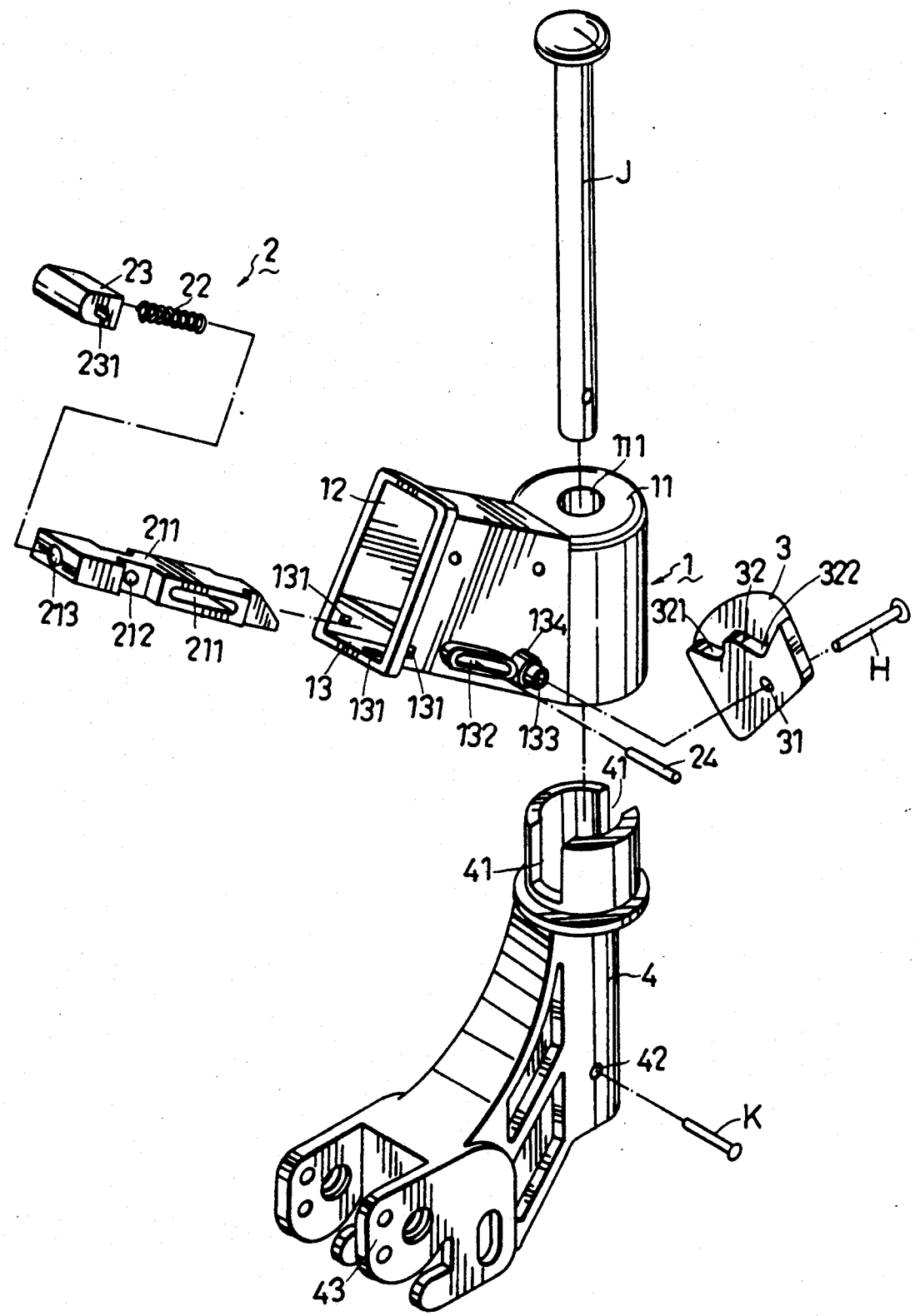
FIG. 7 shows another preferred embodiment of a direction setting device of the present invention.

A single plate (3) with the above-mentioned type control groove in stead of a U-shaped frame (3) can also be employed as shown in FIG. 7.

In order to facilitate the pivoting of the U-shaped frame (3), an actuator (L) can be fixed to the U-shaped frame (3), as seen in FIG. 5. It can be seen from comparing the prior art device with the present direction setting device that the present device contains fewer components and has a simplified structure, it is therefore easy to produce and assemble.

With the invention thus explained it is obvious to those skilled in the art that various modifications and variations can be made without departing from the scope and spirit of the present invention. It is therefore intended that this invention be limited only as in the appended claims.

I claim:

1. A direction setting device for a roller of a stroller, including a first connector adapted to be connected to a leg which supports a seat of said stroller, said first connector having a tubular member and a housing extending at an incline from said tubular member and in communication with the same, said housing confining a receiving space;

a second connector adapted to be connected to said roller of said stroller and having a tubular top portion with a control notch rotatably and slidably connected to said first connector;

a spring biased key member movably provided in said receiving space of said housing, which key member is biased to extend into said control notch of said second connector to prevent rotation of said second connector relative to said first connector:

characterized in that said housing includes two aligned first elongated slots;

said spring biased key member has a second elongated through slot therethrough and a through-hole adjacent to said second elongated through slot;

a control member includes a plate which is provided on said housing, and has an inner surface with a control groove formed therein, which inner surface abuts against said housing, said control groove including a first trough, a second trough deeper than said first trough and a ridge between said first and second troughs;

a first pin member pivotally connects said plate to said housing and passes through said second elongated through a slot of said key member;

a second pin member passes through said through-hole of said key member and said first elongated slots of said housing with one free end of said second pin member extending into said second trough of said plate; and said second pin member being movable in said control groove of said plate between a first position in said second trough where said key member extends into said control notch, preventing the rotation of said second connector relative to said first connector, and a second position in said first trough where said key member retracts from said control notch permitting the rotation of said second connector relative to said first connector.

2. A direction setting device as claimed in claim 1, wherein a lower portion of said second connector is integrally formed with a roller holder of said roller.

3. A direction setting device as claimed in claim 1, wherein said control member further includes a rod connected thereto for manually pivoting said control member about said housing.

4. A direction setting device as claimed in claim 1, wherein said control member has a substantially U-shaped frame with two side plates.

* * * * *